United States Patent [19]

Vossler et al.

[11] Patent Number: 5,408,492
[45] Date of Patent: Apr. 18, 1995

[54] SOLID MEDIUM OPTICAL RING LASER ROTATION SENSOR

[75] Inventors: Gerald L. Vossler, Ann Arbor; Michael D. Olinger, Kentwood; Jerry L. Page, Alto, all of Mich.

[73] Assignee: Smiths Industries Aerospace & Defense Systems, Inc., Grand Rapids, Mich.

[21] Appl. No.: 65,836

[22] Filed: May 21, 1993

[51] Int. Cl.$^6$ .............................................. H01S 3/083
[52] U.S. Cl. ..................................... 372/94; 356/350; 372/6; 372/26; 385/14
[58] Field of Search ................... 372/6, 20, 22, 26, 94; 385/14, 27, 39, 42; 356/350

[56] References Cited

U.S. PATENT DOCUMENTS

| | | | |
|---|---|---|---|
| 4,530,097 | 7/1985 | Stokes et al. | 372/6 |
| 4,592,656 | 6/1986 | Egli | 356/350 |
| 4,923,299 | 5/1990 | Anderson et al. | 356/350 |
| 4,964,131 | 10/1990 | Liu et al. | 372/6 |

OTHER PUBLICATIONS

Ross, Monte, "Laser Applications", Academic Press, 1971, vol. 1, pp. 133–200 (No Month).
Chow, W. W. et al., "The Ring Laser Gyro", Reviews of Modern Physics, vol. 57, No. 1, Jan. 1985, pp. 61–104.
Caroll, Raymond et al., "Backscatter and the Resonant Fiber-Optic Gyro Scale Factor", Journal of Lightwave Technology, vol. 7, No. 12, Dec. 1989, pp. 1895–1900.
Bernard, W. et al., "Fundamentals of a Fiber Integrated Brillouin Ring Laser Gyro", Symposium Gyro Technology 1991, Stuttgart, Germany, pp. 12.0–12.10 (No Month).
Mark, J. et al., "A Rate Integrating Fiber Optic Gyro", Symposium Gyro Technology 1991, Stuttgart, Germany, pp. 13.0–13.10. (No Month).
Lallier, Eric et al., "Nd:MgO:LiNbO3 Channel Waveguide Laser Devices", IEEE Journal of Quantum Electronics, vol. 27, No. 3, Mar. 1991, pp. 618–625.
Sabert, H. et al., "Spatial Hole Burning in $Nd^{3+}$-fiber Lasers Suppressed by Push-Pull Phase Modulation", Applied Physics Letters 58(21), 27 May 1991, pp. 2323–2325.
Sennaroglu, Alphan et al., "Unidirectional Operation of Rectangular Dielectric Single-Mode Ring Waveguide Lasers", Journal of Lightwave Technology, vol. 9, No. 9, Sep. 1991, pp. 1094–1098.

(List continued on next page.)

Primary Examiner—John D. Lee
Attorney, Agent, or Firm—Varnum, Riddering, Schmidt & Howlett

[57] ABSTRACT

An optical rotation sensor comprises a light amplification stimulated emission ring laser formed in a solid medium is provided with phase modulator devices which produce push-pull phase modulation of counter-propagating optical waves in the ring thereby enhancing bidirectional lasing in single longitudinal modes in each direction. A frequency selective output coupler couples a predetermined portion of the optical energy at the lasing frequency from the ring to an output waveguide. A substantially U-shaped output waveguide having legs extending away from the ring in opposite directions and toward a common position. Clockwise and counterclockwise light waves are coupled from the ring to the two separate legs of the output waveguide and are directed to the common position to create an interfering light pattern on photodetector apparatus. The interfering light pattern is indicative of the rate of rotation, as defined by the Sagnac effect. Signal processing circuitry connected to the detector derives navigation and flight control information from the detector. In one embodiment, the ring laser and input and output couplers are implemented in a rare earth-doped lithium niobate substrate. In another embodiment, the ring laser and the input and output waveguides are implemented in rare earth-doped optical fibers. In a further embodiment, the ring laser and input and output couplers as well as the phase modulators and the photodetector apparatus are implemented in a single semiconductor substrate and gain electrically supplied to the ring laser.

24 Claims, 5 Drawing Sheets

OTHER PUBLICATIONS

Brinkmann, R. et al., "Fluorescence and Laser Operation in Single-Mode Ti-Diffused ND:MgO:LiNbO$_3$ Waveguide Structures", IEEE Journal of Quantum Electronics, vol. 28, No. 2, Feb. 1992, pp. 466–470.

Hansen, P. B. et al., "A 1.54-$\mu$m Monolithic Semiconductor Ring Laser: CW and Mode-Locked Operation" IEEE Photonics Technology Letters, vol. 4, No. 5, May 1992, pp. 411–413.

Yu A. et al., "Novel Fibre Optic Gyroscope With a Configuration Combining Sagnac Interferometer With Fibre Ring Resonator", Electronics Letters, 10 Sep. 1992, vol. 28, No. 19, pp. 1778–1780.

Huang, S. et al., "Lock-in Reduction Technique for Fiber-Optic Ring Laser Gyros", Optics Letters, Apr. 1, 1993, vol. 18, No. 7, pp. 555–557.

SOLID MEDIUM OPTICAL RING LASER ROTATION SENSOR

BACKGROUND IN THE INVENTION

1. Field of the Invention

This invention relates to optical rotation rate sensors and more particularly to ring laser rotation rate sensors.

2. Background Art

Optical rotation sensors such as gyroscopes are highly sensitive devices which, by the application of a relativistic effect commonly known as the Sagnac effect, are used to determine rotation of a vehicle about an axes. Typically, three separate gyros are used in aircraft and space vehicles to measure rotation about three orthogonal axes. Navigation and flight control information is derived from rotation measurements about the three orthogonal axes.

One type of optical rotation sensor, the so called fiber optic gyro (FOG), employs a coil of optical fiber through which light waves are transmitted in opposite directions. Optical waves emerging from the coil are combined and transmitted to a photodetector. Analysis, typically by means of a connected signal processor, of the interference pattern of the combined light waves at the photodetector provides an indication of rate and direction of rotation.

Another type of optical rotation sensor is the so called ring laser gyro (RLG). Typically, prior art RLG consist of a dimensionally-stable polygon with at least three edges with mirrors positioned at the corners. A cavity formed in the polygon contains a gas mixture which supports and amplifies counterpropagating laser beams. Counterpropogating laser beams outside the cavity create a standing wave pattern with high and low intensity nodes spaced apart by a distance equal to one-half the wavelength of the laser beam. As the gyro is rotated, the optical path length changes, as defined by the Sagnac effect. The change in path length is accompanied by a differential change in wavelength of the counter rotating beams and causes a shift in the position of the light intensity nodes. A photodetector directed at the position of one of the nodes detects an intensity change resulting from the change in wavelength when the gyro is rotated about its axis. Signal processing circuitry analyzes the intensity change detected by the photodetector and derives navigation and flight control information related to the rotation of the gyro from the change in light intensity.

Prior art ring laser gyros using a gas filled cavity and a mirror structure have the disadvantage that a proper gas mixture must be maintained in a confinement vessel and that high quality mirror surfaces must be fabricated and precisely configured and aligned in order to obtain a desired effect. Furthermore, a mechanical dithering mechanism is typically provided, further complicating the structure. It is therefore desirable to provide a ring laser gyroscope which does not use a gas and is less expensive to manufacture and smaller in mass and size dimensions, particularly for spacecraft applications, and which avoids the alignment and other mechanical problems of the prior art devices.

Experiments with integrated optic devices of various kinds have been performed including the implementation of rare earth doped waveguide lasers in both glass and lithium niobate. Fabrication of erbium doped waveguides and neodymium doped waveguide Fabry-Perot lasers in lithium niobate have been reported. Erbium and neodymium doped silica fiber lasers in both Fabry-Perot and ring-resonator configurations have also been reported. In separate developments, monolithic integration of ring-resonator waveguides with semiconductor lasers has been used in attempts to eliminate the requirements for cleaving or for distributed feedback structures in integrated photonic circuits. Ring-resonator lasers have also been produced using GaAs/GaAlAs and InGaAsP materials. However, no practical application of these various activities has been found which solve the problems inherent in prior art ring laser rotation sensors.

A particular problem in the design of optical ring rotation sensors is the need to produce counterpropagating optical waves required to sense the Sagnac effect that provides an indication of rotation. Bidirectional, counterpropagating optical waves may be produced in a gas ring laser. However, bidirectional waves produced in solid medium ring lasers tend to be unstable. The stable regimes in solid medium lasers exhibit lasing only in a single direction. This bidirectional instability is a consequence a phenomenon known as spatial hole burning in the gain medium, caused by the counterpropagating waves. In addition, backscatter between counterpropagating optical waves is known to cause frequency locking of the counterpropagating waves at low rotation rates, which prevents rotation rate sensing at the low rates. Prior art systems use complicated mechanical dither mechanisms to allow sensing at low rates.

SUMMARY OF THE INVENTION

These and other problems of prior art rotation sensors are overcome in accordance with the principles of this invention by means of a ring laser, utilizing light amplification by stimulated emission, formed in a solid medium provided with phase modulator devices which produce phase modulation of optical waves in the ring in a push-pull fashion thereby enhancing bidirectional lasing, in single longitudinal modes in each direction. Advantageously, the push-pull phase modulation inhibits spatial hole burning in the laser gain medium and suppresses inhomogeneous mode hopping between adjacent ring resonances.

In one embodiment of the invention, the ring laser comprises an optical fiber having a rare-earth doped segment, and fiber segments extending around piezoelectric cylinders which are operative to selectively stretch portions of the optical fiber ring to produce push-pull phase modulation of the optical waves in the ring. In another embodiment of the invention, the ring laser comprises a waveguide formed in an electro-optical substrate. In one specific embodiment of the invention, the ring laser, a light energy input waveguide, an input coupler transmitting light energy from the input waveguide to the ring laser, the output coupler, an output waveguide and the phase modulator devices are integrated into a single electro-optical substrate.

In another embodiment of the invention, the ring laser is formed in substrate comprising a semi-conductor material and electrical energy coupled into the substrate via an energy input device to provide gain in the ring laser. In accordance with one aspect of the invention, the ring laser, the energy input devise, the modulator devises and the output coupler may be integrated in a single semi-conductor substrate. Furthermore, optical detector apparatus may be integrated in the same substrate.

In accordance with one aspect of the invention, a frequency selective output coupling device couples a predetermined portion of optical energy of counterpropagating waves, propagating in the clockwise and counterclockwise directions, from the ring laser to detector apparatus.

In accordance with another aspect of the invention, output waveguide comprises a substantially U-shaped waveguide having legs extending away from the ring laser and counterpropagating lightwaves from the ring are coupled into opposite legs of the substantially U-shaped output waveguide. The waveguide leg ends are directed to a common position to create an interfering light pattern. Advantageously, this arrangement provides an interfering light pattern of counterpropagating waves of the ring projected onto a photodetector apparatus from which a determination of frequency shift due to rotation of the ring is made and navigation and flight control information may be derived.

BRIEF DESCRIPTION OF A DRAWING

DETAILED DESCRIPTION

Figure 1:
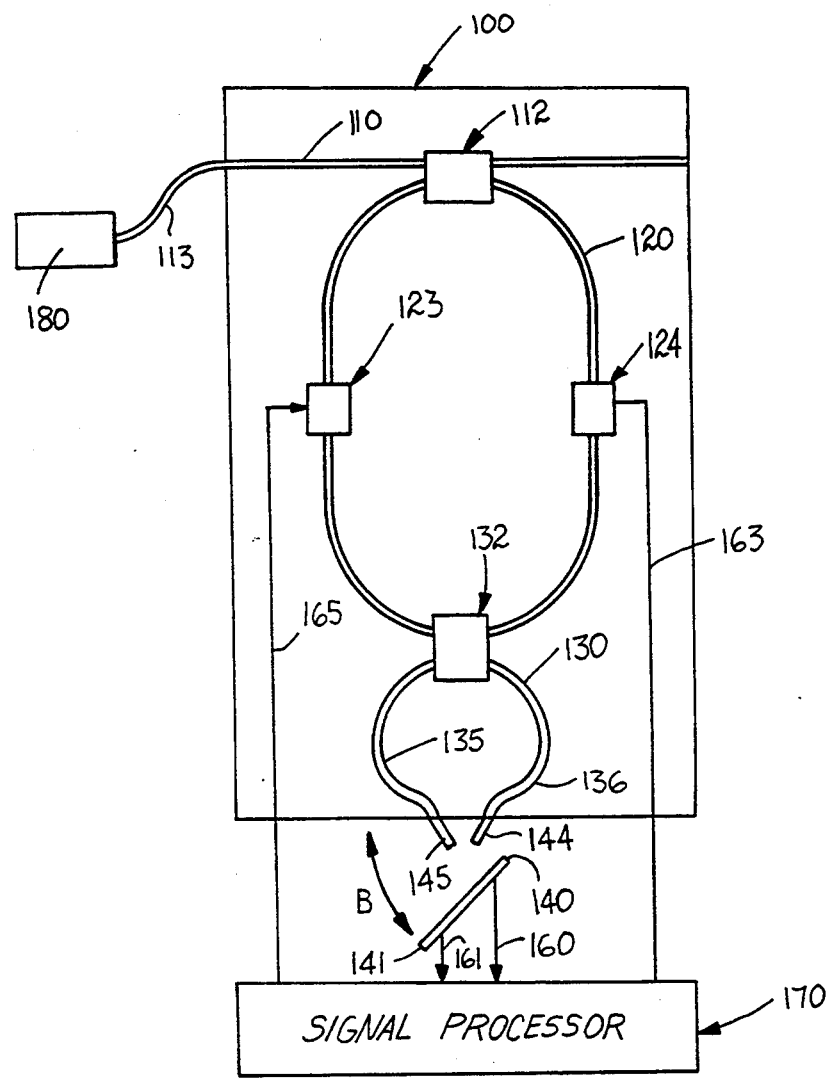
FIG. 1 is a diagrammatic representation of a ring laser formed in an electro-optical substrate with external connections to a light source, photodetector apparatus and a signal processor.

FIG. 1 is a diagrammatic representation of a ring laser rotation sensor incorporating the principles of the invention. The sensor is implemented in a solid medium on a host electro-optic substrate 100, in which are formed a longitudinally extending input waveguide 110, a ring shaped waveguide resonator 120 and a substantially U-shaped output waveguide 130. In one embodiment, the waveguides are formed in a lithium niobate electro-optical substrate in a well known fashion. The lithium niobate may be doped with a rare earth element, such as neodymium or erbium, or materials of similar properties, to provide gain in the waveguide areas, particularly in the ring 120. Magnesium oxide may be added to the lithium niobate substrate to increase tolerance to optical damage (e.g. 5 mol % MgO). For the neodymium-doped lithium niobate devices, there are strong absorption bands at 809 and 813 nanometers and related principal emission lines occur at around 1,093 and 1,085 nanometers, respectively. In addition to laser action due to the neodymium ions, the neodymium, magnesium oxide-doped lithium niobate also provides desirable electro-optic, acousto-optic, and non-linear optic properties in the ring 120. A commercially available laser diode 180 is connected by means of a pigtail connection 113 to the input waveguide 110 and provides a pump light beam. The pump beam preferably has a short wavelength relative to the lasing wavelength of the doping medium (e.g., 813 nanometers, when used with neodymium) in order to create a population inversion in the gain medium. The pump beam is coupled from the input waveguide 110 to a portion of the waveguide ring-resonator 120 via an efficient coupler 112, to cause lasing and counterpropagating clockwise and counterclockwise optical waves to occur in the ring. A U-shaped output waveguide 130 is coupled to another portion of the ring and is provided with legs 135, 136 extending away from the ring in opposite directions and clockwise and counterclockwise optical waves propagating in the ring are coupled to oppositely extending legs. Optical fibers 145, 144 direct light from the ends of the legs 135, 136, respectively, to a pair of photodetectors 140, 141, projecting an interfering light pattern representative of the clockwise and counterclockwise optical waves on the detectors. A commercially available signal processor, connected to the detectors 140, 141 via conductors 160, 161 analyzes the detector output in a well-known fashion to derive vehicle rotation rate and direction information from the gyro output. Phase modulators 123, 124 are integrated in the substrate and responsive to signals from signal processor 170 to modulate the optical waves in ring 120 to inhibit frequency locking and to prevent unidirectional lasing.

Figure 2:
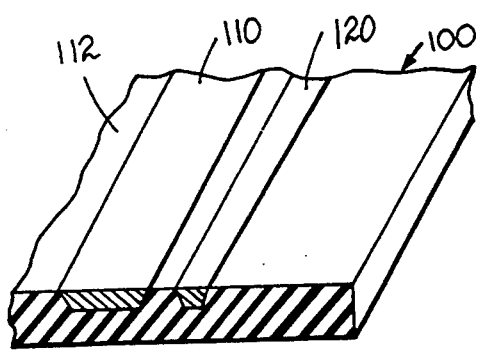
FIG. 2 is a diagrammatic representation of an optical coupling in the substrate of FIG. 1 between an input waveguide and the resonant ring laser in the substrate of FIG. 1.

FIG. 2 is a perspective view of a section of the substrate 100 including the coupler 112. The coupler 112 is fabricated in a known fashion arranged to maximize the amount of pump light coupled into the ring 120 and to minimize the coupling of counterpropagating optical waves from the ring 120 into the waveguide 110. A well-known period grating may be inserted between adjacently disposed waveguides 110, 120 to facilitate greater wavelength selectivity. Additionally, a voltage may be selectively applied to the coupler 120 to enhance effective index matching through electro-optic tuning. Lasing preferably occurs in the neodymium-doped, magnesium oxide-doped lithium niobate substrate at low pump threshold value (e.g., several milliwatts). These low threshold values are a result of the confinement of the pump light to a small effective cross section (e.g. 30 $\mu m^2$) in the waveguide, obtained by proper control in the waveguide forming process.

When the pump light, generated by diode laser 180 at relatively short wavelengths (e.g., 813 nanometers), is coupled into the ring 120, a population inversion occurs in the neodymium doped ring 120 which produces bidirectional lasing at a longer wavelength (e.g., 1.085 microns). The ring laser forms a resonator and the frequency of counterpropagating beams produced by the laser action is determined by the path length within the resonator in the clockwise and counterclockwise direction. It is well-known that light beam frequencies in a ring-resonator may be expressed as follows: $f_m = m 2\pi c / n P_i$, where $f_m$ is the $m^{th}$ frequency, n is the effective index of refraction of the resonator, $P_i$ is the path length in the i direction and c is the speed of light in vacuum. When the resonator is rotated, a path length difference between the clockwise and counterclockwise paths may be observed, which is defined by the Sagnac effect. The path difference $\Delta P$ is proportional to the rate of rotation $\Omega$ and may be expressed as $\Delta P=4A\Omega n/c$, where A is the area enclosed by the ring, n is the effective index of refraction in the ring-resonator waveguide and c is the speed of light.

Lasing occurs within the ring at a frequency where gain is sufficient to overcome losses in the ring and an integral number of wavelengths occurs in the optical path within the resonator. The wavelengths, and hence the frequencies of bidirectional laser light, changes as the optical path length changes due to rotation of the resonator ring. The frequency difference between laser beams traveling in the clockwise and counterclockwise directions may be expressed as $\Delta f=2R\Omega/\lambda$ which may also be written as $\Omega=(\lambda/2R)\Delta f=S\Delta f$. Thus, the frequency difference between the clockwise and counterclockwise beams is related to the rotation rate of the ring by a scale factor S. This frequency difference is detected from the detectors 140 and 141 and the signal processor 170, connected to these detectors by electrical conductors 160, 161, derives an indication of the rate of rotation from the frequency difference and the known scale factor, in a well-known fashion.

The selectivity, or finesse, of the ring-resonator is determined by losses occurring in the resonator. One type of loss is due to attenuation and scattering, including those introduced due to the bending required to produce a ring-resonator. The ring 120 is preferably circular/elliptical in shape and the radius of the ring is selected to optimally trade-off waveguide losses against performance and is unique for each application.

Figure 3:
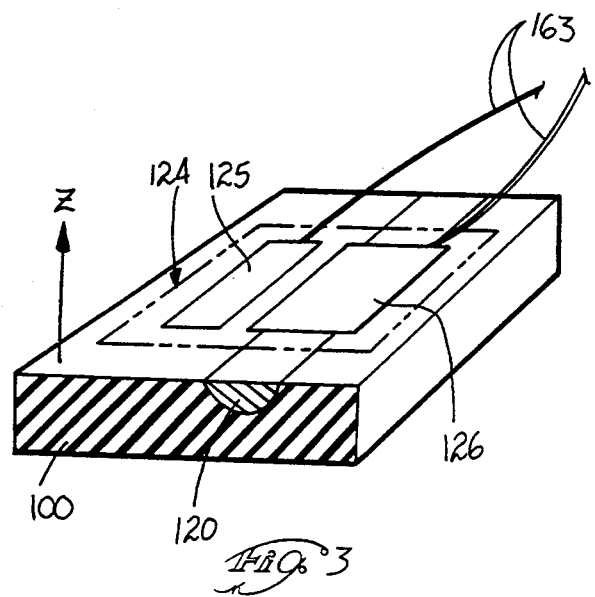
FIG. 3 is a diagrammatic representation of a phase modulator incorporated in the substrate of FIG. 1.

As noted earlier with reference to FIG. 1, the ring 120 is provided with phase modulators 123 and 124. The purpose of phase modulators is to vary the optical path length of the ring in the opposite directions to inhibit frequency locking and unidirectional lasing. This variation, or dither, changes the frequencies of the counterpropagating optical waves in a push-pull fashion, increasing (decreasing) the frequency in one direction while decreasing (increasing) the frequency in the opposite direction. The phase modulators 123, 124 are identical in structure and operation. Each modulator comprises a pair of electrodes arranged on substrate 100, as illustrated in FIG. 3 for modulator 123. The lithium niobate substrate 100 is preferably a Z-cut crystal structure and the modulator 124 comprises one electrode 125 positioned adjacent a selected portion of the ring 120 and another electrode 126 positioned over the selected portion of the ring 120. An electric field may be established in the selected portion of the ring by the application of an appropriate signal on conductor 163 from the signal processor 170. The electric field produces a localized change in the index of refraction of the ring 120 due to the electro-optic properties of the lithium niobate substrate, in a well known fashion.

Since the full width at half maximum of the gain curve for neodymium, magnesium oxide-doped lithium niobate around 1085 nanometers is approximately four nanometers, the possibility of multiple longitudinal modes exists. For a small ring cavity with perimeter of one centimeter, the spacing of the longitudinal cavity modes is approximately 0.5 angstroms and several longitudinal modes may be supported in the resonator ring 120. The phase modulators 123, 124 are preferably placed symmetrically in the ring 120 and excited in an anti-phase fashion to produce push-pull phase modulation. The processor 170 may apply separate sine wave signals, 180° out of phase, to the two separate modulators to achieve the desired modulation. The period of modulation frequency is greater than the recovery time of the population in the medium. The amplitude of the modulation is selected to minimize the spatially varying portion of the average power in the ring. The push-pull phase modulation eliminates spatial hole burning in the laser gain medium by varying the spatial location of the peaks of the intensity distribution of the optical waves at a rate faster than the relaxation time of the gain medium. Furthermore, the push-pull phase modulation produces a single longitudinal mode in each direction by suppressing inhomogeneous mode hopping between adjacent ring resonances. In this manner, push-pull modulation enhances bidirectional lasing in the solid medium ring in a single longitudinal mode in each direction. Furthermore, the anti-phase excitation of the phase modulators in a push-pull fashion provides an electrically controllable dither signal which prevents frequency mode locking of the counterpropagating optical waves.

Light energy at the lasing wavelength must be coupled out of the ring 120 to the detectors 140, 141 for readout by the signal processor 170. The ring 120 is coupled to output waveguide 130 by means of a coupler 132 which is similar to the wavelength sensitive coupler 112 described above with reference to FIG. 2. The coupler 132 is fabricated to be wavelength sensitive in a manner described earlier herein with respect to FIG. 2. The coupler 132 is preferably arranged to minimize the amount of pump light coupled out of the ring 120 and to control the coupling of counterpropagating laser beams from the ring 120 to output waveguide 130. The amount of output coupling is selected to optimize performance of the rotation sensor and only a selected portion of the optical energy of the two counterpropagating waves is coupled out of the ring. The counterclockwise light beam in the ring 120 is coupled into leg 136 of the output waveguide 130 and the clockwise light beam of the ring 120 is coupled into leg 135 of the output waveguide 130. Light energy from the clockwise and counterclockwise beams in the ring 120 is directed from legs 136, 135 to the detectors 140, 141, respectively, via optical fibers 144 and 145.

Figure 4:
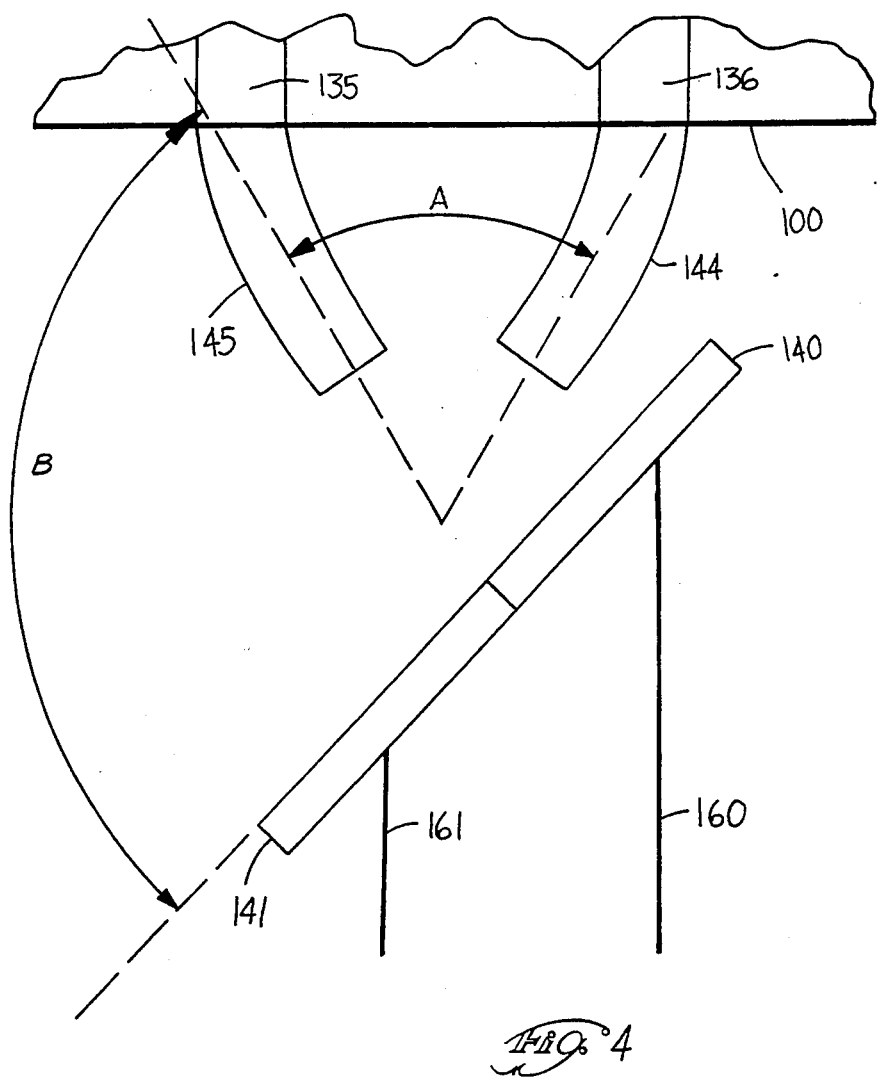
FIG. 4 is a diagrammatic representation of a pair of optical fibers arranged to project an interfering light pattern representative of counterpropagating waves onto the photodetector apparatus.

The output fibers 144, 145 are brought in close proximity of the photodetectors 140, 141 and extend at an angle A relative to each other, as represented in FIG. 4. The detectors 140, 141 are standard photo-electric cells and are arranged adjacent each other in a plane extending at an angle B to output fiber 145. The angles A and B are selected based on wavelength to optimize the spatial separation of the interference pattern with respect to the size of the detectors.

When ring 120 rotates, the frequency difference $\Delta f$ between the two counterpropagating beams causes light incident on the detectors to alternate between high and low density at a rate equal to the frequency difference and proportional to the rate of rotation of the ring. The phase modulators 123, 124 operate continuously and cause a frequency modulation of the intensity pattern on detectors 141, 142, in addition to intensity pattern variations caused by rotation of the ring 120. The phase modulations may be removed from the detector output signal by the processor 170 in a well known fashion. The demodulated intensity pattern is a traveling wave of the form $I_0[2+\cos(\Delta ft-kx)]$ where $I_0$ is peak intensity, $\Delta f$ is the frequency difference between counterpropagating beams, t is elapsed time, x is the spacial coordinate of the detector plane, k is a constant determined from angles A and B in a well known fashion. As the frequency difference $\Delta f$ between the counterpropagating beams changes, the intensity pattern changes frequency as it moves across the detectors.

The output of the detectors 140, 141 is transmitted to the signal processor 170 via conductors 160, 161. Based on the relationships of the intensity pattern as outlined above, the signal processor computes a rotation rate by demodulating the intensity variation at each of the detectors and multiplying by the scale factor S from the equation $\Omega=S\Delta f$. The signal processor, in addition to computing the rotation rate determines the direction of rotation by comparing the demodulated outputs of the two detectors 140, 141. The demodulated output of one detector will lead the demodulated output of the other during a clockwise rotation and lag during a counterclockwise rotation.

Figure 5:
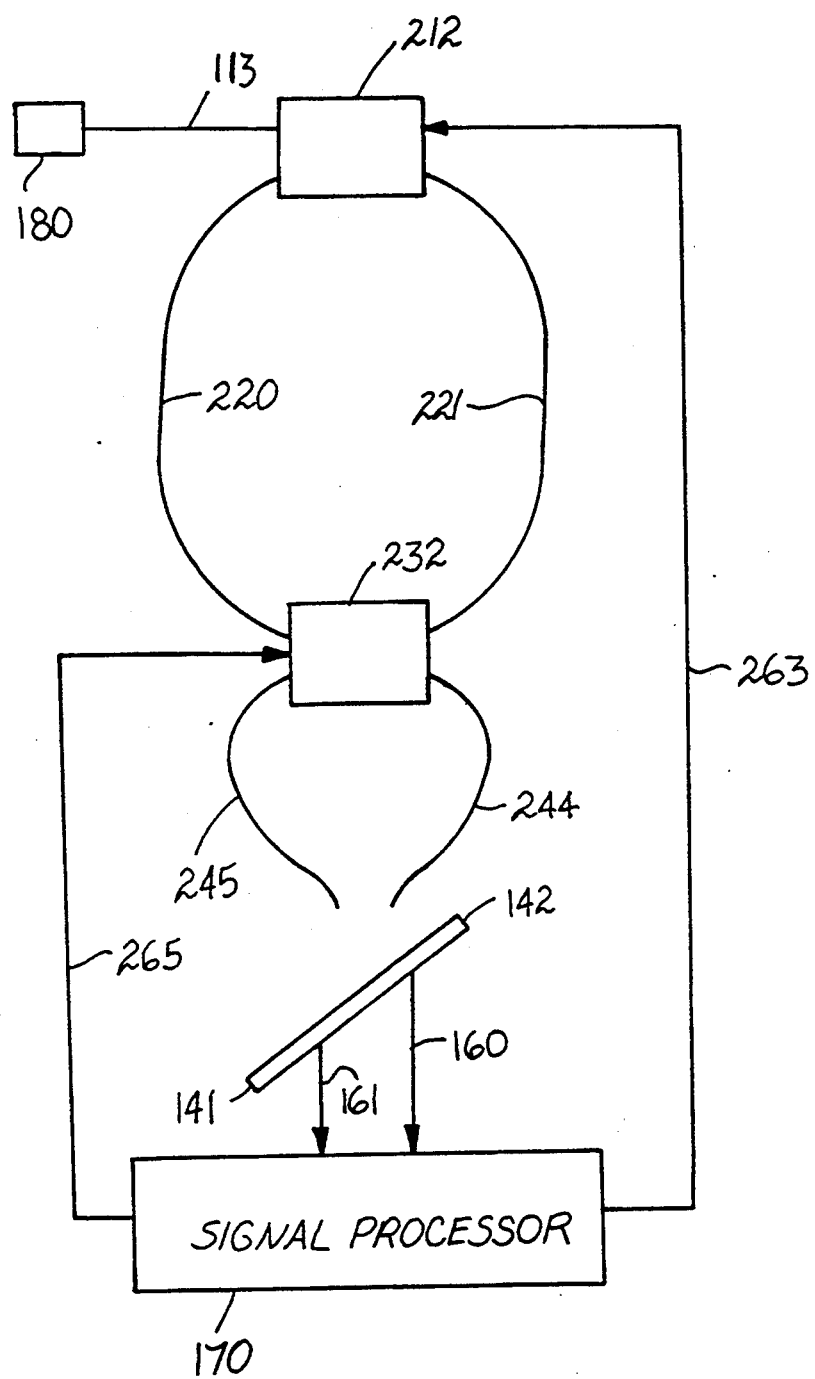
FIG. 5 is a diagrammatic representation of a ring laser implemented by optical fibers.
Figure 6:
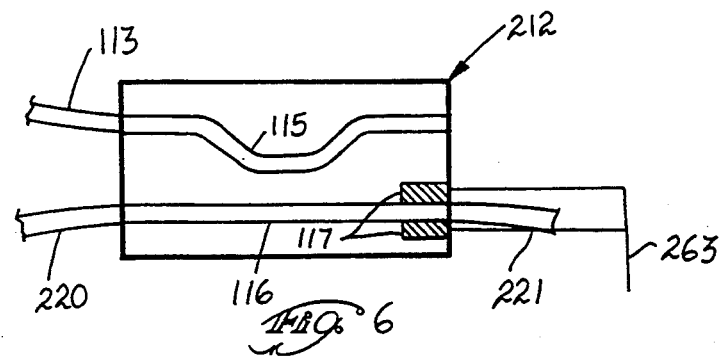
FIG. 6 is a more detailed representation of an input coupler as shown in FIG. 5.

FIG. 5 is a diagrammatic representation of a solid medium optic ring laser rotation sensor incorporating the principles of the invention, implemented utilizing telecommunications grade optical fiber. The ring-resonator is formed from rare-earth doped fibers 220 and 221, which are selected to be single mode at the lasing wavelength. An input coupler 212 and output coupler 232 connect to the fibers 220, 221. Light generated by laser diode 180 is pigtailed via optical fiber 113 to input coupler 212 which is constructed as a wavelength division multiplexer. The wavelength division multiplexer 212 and is a well-known device which selectively transfers optical energy of different wavelength among its input/output ports. The wavelength division multiplexer 212 is designed to maximize the amount of optical energy transferred from fiber 113 to fibers 220 and 221 at the frequency of the pump light, and to maximize the amount of optical energy at the lasing frequency transferred between fibers 220 and 221 while minimizing the amount of optical energy at the lasing frequency transferred from fibers 220, 221 to fiber 113. FIG. 6 shows an electro-optic implementation of coupler 112. Waveguides 115 and 116 form a frequency selective directional coupler which implements the requirements described above. In addition, a phase modulator is implemented as part of the coupler 212 by a pair of electrodes 117. An electrical connection 263 to signal processor 170 provides the control voltages for the phase modulator in a fashion described above with reference to FIGS. 1 and 3.

The arrangement and function of fibers 244, 245, detectors 141, 142 and the electrical connections 160, 161, to the signal processor 170 are identical to those described above in the lithium niobate implementation of FIGS. 1 through 4.

Figure 7:
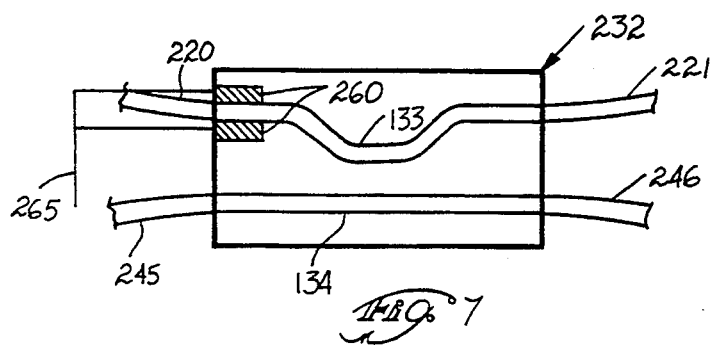
FIG. 7 is a more detailed representation of an output coupler as shown in FIG. 5.

Output coupler 232 is a well known wavelength division multiplexer and is preferably designed to couple a portion (e.g., approximately 10%) of the optical energy at the lasing frequency from optical waves, propagatively in the clockwise direction (from fiber 221 to fiber 245) and in the counterclockwise direction (from fiber 220 to fiber 244), out of the ring. FIG. 7 shows an electro-optic implementation of output coupler 232. Waveguides 133 and 134 form a frequency selective directional coupler which implements the requirements described above. In addition, a phase modulator is implemented as part of coupler 232 by means of electrodes 260 on waveguide 133. Electrical connection 265 to signal processing 170 provides the control voltages for the phase modulator in a fashion described above with reference to FIGS. 1 and 3.

Figure 8:
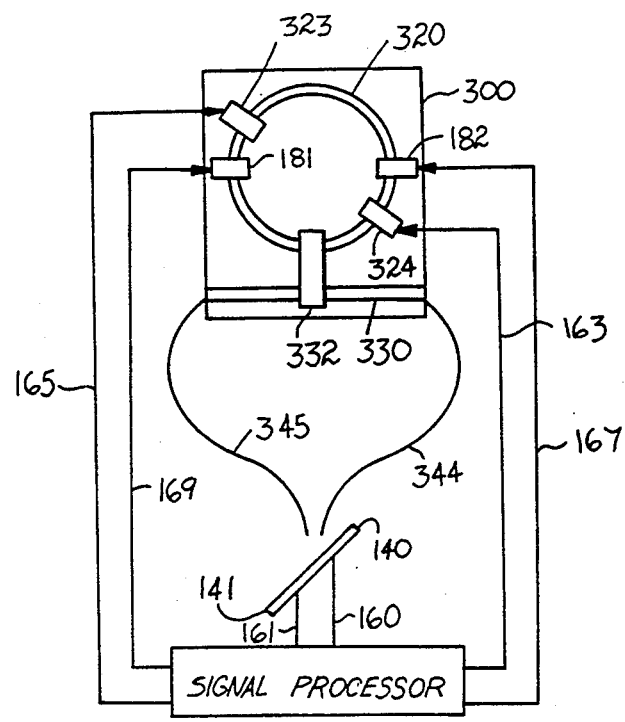
FIG. 8 is a diagrammatic representation of a rotation sensor including a ring laser implemented in a semiconductor substrate.
Figure 9:
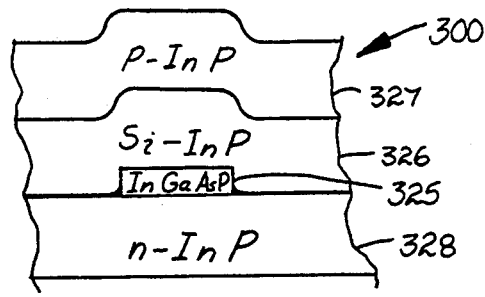
FIGS. 9 through 11 are cross-sectional representations of portions of the substrate of FIG. 8.
Figure 10:
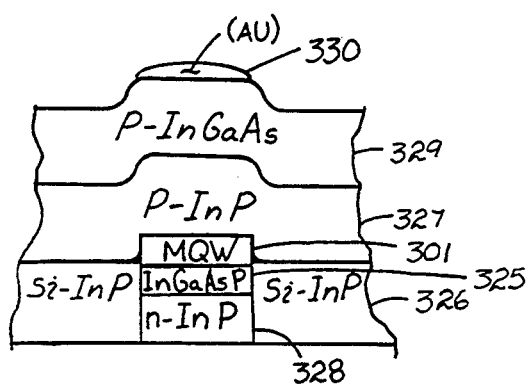

FIG. 8 shows a schematic diagram of an implementation of a rotation sensor of the invention in a substrate 300 consisting of semiconductor material. Gallium arsenide or other semiconductor materials such as indium gallium phosphate or aluminum gallium arsenic may be used to implement a solid medium ring laser in the substrate. A solid medium ring laser is formed in the substrate 300, as a buried waveguide, as depicted in FIG. 9. An indium gallium arsenide phosphate waveguide 325 is formed in a silicon indium phosphate layer 326. A layer of p-type indium phosphate 327 and a layer of n-type indium phosphate 328 are added above and below the area of the waveguide 325. Energy is supplied to the ring laser by the application of electrical signals applied via active sections 181 and 182 (FIG. 8). The electrical signals are supplied by the signal processor 170 via electrical connectors 167, 169. FIG. 10 represents the structure of one of the active sections, 181, which produces amplification by injecting carriers into a multiple quantum well (MQW) structure 301. Active section 182 is implemented in the same manner. As shown in FIG. 10, the multiple quantum well has been positioned between the waveguide 325 and the upper p-layer 327. A further layer 329 of p-type indium gallium arsenide has been added over the upper layer 327. Electrical connections are made to a gold contact area 329 and the n-layer 328 to control the injection of carriers into the multiple quantum well.

Figure 11:
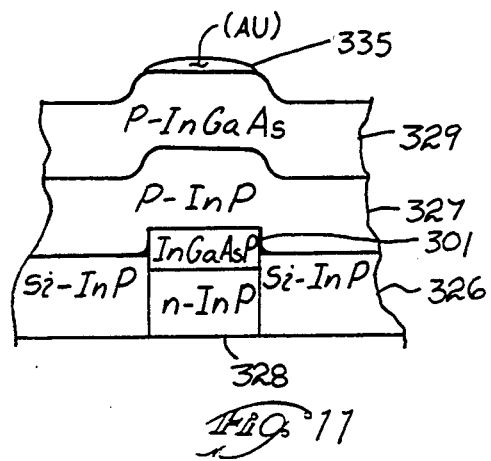

Phase modulators 323, 324, shown in FIG. 8, may be implemented in the substrate 300 as depicted in FIG. 11. A gold contact area 335 has been added in the area of the phase modulators, and electrical connections are made to the contact area 325 and the n-layer 328. An output coupler 332 (FIG. 8) may be implemented in substrate 300 in a manner analogous to that described with reference to couplers 112, 132 and FIGS. 1 and 2. An output waveguide 330 may be formed in the manner shown in FIG. 9. Light energy representative of clockwise and counterclockwise propagating waves is transmitted by optical fibers 344, 345 from opposite ends of waveguide 332 to photodetectors 140, 141 and the output of these detectors is processed by signal processors 170, in the manner described above with reference to FIG. 1.

Figure 12:
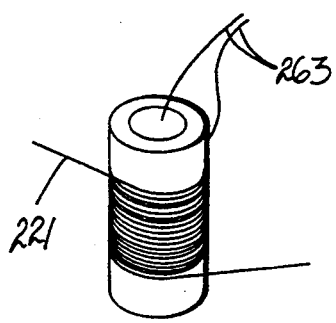
FIG. 12 is a diagrammatic representation of a piezoelectric phase modulator in the ring laser of FIG. 5.

FIG. 12 is a representation of a phase modulator element in the form of a cylinder of piezoelectric material. The piezoelectric modulator element may be used in the ring laser of FIG. 5 instead of the electrode modulators 117, 260 shown in FIGS. 6 and 7, respectively. One piezoelectric element is used in each of the fibers 220, 221, and preferably symmetrically spaced on the loop formed by fibers 220, 221. FIG. 12 shows a portion of the fiber 221 wound tightly around piezoelectric cylinder 230. A sinusoidal signal is applied to the cylinder via conductors 263 in a standard fashion. The application of the electrical signal causes the piezoelectric to expand and contract, thereby causing the portion of the fiber wound around the cylinder to be stretched or contracted. In this fashion, the optical path in the fiber is altered periodically to generate a desired modulation of the lightwaves.

It is to be understood that the above-described arrangement is merely illustrative of the principles of the invention and that other arrangements may be devised by those skilled in the art without departing from the spirit and scope of the invention.

What we claim is:

1. A rotation rate sensor comprising:
 a light amplification by stimulated emission ring laser formed in a solid medium and having counter-propagating optical waves propagating in the clockwise and counterclockwise directions in the ring;
 optical detector apparatus;
 phase modulator devices modulating the counter-propagating waves;
 an output coupler coupling optical energy propagating in the clockwise and counterclockwise direction from the ring laser to the optical detector apparatus; and
 a signal source connected to the phase modulator devices controlling the phase modulator devices to produce push-pull phase modulation of the optical waves in the ring, thereby enhancing bidirectional lasing in single longitudinal modes in each direction.

2. The rotation rate sensor in accordance with claim 1 wherein the solid medium is doped with a rare earth element to provide optical gain.

3. The rotation rate sensor in accordance with claim 2 and comprising a light source producing light energy in a predetermined frequency range and an input coupler arranged to selectively couple light in the predetermined frequency range from the light source into the ring laser.

4. The rotation rate sensor in accordance with claim 2 wherein the rare earth element is selected from a group consisting of erbium and neodymium.

5. The rotation rate sensor in accordance with claim 1 wherein the output coupler comprises a frequency selective device selectively coupling a predetermined portion of the optical energy at the lasing frequency from the ring to the detector apparatus.

6. The rotation rate sensor in accordance with claim 1 wherein the ring laser comprises an optical fiber.

7. The rotation rate sensor in accordance with claim 6 and further comprising an input coupler and wherein the input coupler and the output coupler comprise optical fibers.

8. The rotation rate sensor in accordance with claim 7 wherein the output coupler further comprises an optical wavelength division multiplexer.

9. The rotation rate sensor in accordance with claim 6 and further comprising an input coupler and wherein the input coupler further comprises an optical wavelength division multiplexer.

10. The rotation rate sensor in accordance with claim 6 wherein the phase modulating devices comprise piezoelectric elements operative to stretch portions of the optical fiber ring laser.

11. The rotation rate sensor in accordance with claim 6 and further comprising an input coupler and wherein the input coupler and the output coupler comprise integrated electro-optical devices.

12. The rotation rate sensor in accordance with claim 6 wherein the phase modulating devices comprise electro-optical elements.

13. The rotation rate sensor in accordance with claim 1 wherein the ring laser comprises a waveguide formed in an electro-optical substrate.

14. The rotation rate sensor in accordance with claim 13 and further comprising a light energy input waveguide and an input coupler coupling light energy from the input waveguide to the ring laser waveguide and wherein the input waveguide, the input coupler, the output coupler and the phase modulator devices are integrated in a single electro-optical substrate.

15. The rotation rate sensor in accordance with claim 14 wherein the substrate comprises a material selected from a group consisting of lithium niobate and lithium tantalate.

16. The rotation rate sensor in accordance with claim 15 wherein the substrate is co-doped with magnesium oxide.

17. The rotation rate sensor in accordance with claim 1 wherein the ring laser is formed in a substrate comprising a semiconductor material.

18. The rotation rate sensor in accordance with claim 17 and further comprising an energy input device wherein electrical energy is coupled into the substrate via the energy input device to provide gain in the ring laser.

19. The rotation rate sensor in accordance with claim 18 wherein the ring laser, the energy input device, the phase modulator devices and the output coupler are integrated in a single semiconductor substrate.

20. The rotation rate sensor in accordance with claim 19 wherein the optical detector apparatus is integrated in the substrate.

21. The rotation rate sensor in accordance with claim 17 wherein the substrate comprises a compound of elements selected from a group consisting of Indium, Gallium, Arsenic, Phosphorous and Aluminum.

22. The rotation rate sensor in accordance with claim 1 wherein the output coupler comprises an output waveguide comprising a substantially U-shaped waveguide having a pair of legs extending away from the ring laser in opposite directions and toward a common position and wherein the clockwise and counterclockwise propagating optical waves are coupled to oppositely extending legs and emerge to form an interfering light pattern at the optical detector apparatus.

23. The rotation rate sensor in accordance with claim 1 wherein the phase modulator devices are symmetrically spaced apart in the ring and are controlled by anti-phase control signals.

24. In combination, an active ring laser comprising a ring formed in a solid laser gain medium, an input coupler coupling a pump light of a predetermined wavelength into the ring laser, the ring laser producing counter-propagating optical waves through light amplification by stimulated emission at wavelengths longer than the predetermined wavelength, the combination further comprising a pair of phase modulator electrodes spaced apart on the ring for applying push-pull phase modulation to the counter-propagating waves in the ring.

* * * * *